(12) United States Patent
Speers et al.

(10) Patent No.: US 6,370,242 B1
(45) Date of Patent: Apr. 9, 2002

(54) PAYPHONE ELECTRONIC COIN VALIDATOR

(75) Inventors: Robert Speers, West Chester; Paul Allen, Lampeter, both of PA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/490,216

(22) Filed: Jan. 24, 2000

(51) Int. Cl.[7] .......................... H04M 17/00; G06F 19/00
(52) U.S. Cl. ...................... 379/145; 379/150; 379/146; 194/217
(58) Field of Search ................................. 379/143, 145, 379/147, 148, 149, 154, 155, 150, 146, 144.03; 194/217, 319, 335, 344, 348, 350, 334

(56) References Cited

U.S. PATENT DOCUMENTS

| | | | |
|---|---|---|---|
| 3,997,726 A | * 12/1976 | De Crepy | .................. 379/143 |
| 4,777,647 A | 10/1988 | Smith et al. | |
| 4,924,497 A | 5/1990 | Smith et al. | |
| 4,942,604 A | 7/1990 | Smith et al. | |
| 5,896,446 A | * 4/1999 | Sagady et al. | .............. 379/146 |
| 5,907,606 A | * 5/1999 | Ingalsbe et al. | ............ 379/146 |
| 5,988,347 A | * 11/1999 | Schwab | ...................... 194/217 |

\* cited by examiner

*Primary Examiner*—Curtis Kuntz
*Assistant Examiner*—Rexford N Barnie
(74) *Attorney, Agent, or Firm*—Fish & Richardson P.C.

(57) ABSTRACT

An electronic coin validator for connection to a payphone chassis is described. The validator includes a coin passageway having at least one coin sensor, power circuitry for connection to payphone chassis power lines and connected to the coin sensor, a validator line balance circuit connected to the power circuitry, at least one coin signal line for connection to the payphone chassis, at least one coin value buffer, and a control means. The control means processes signals from the sensor to validate coins, adjusts the count in the coin value buffer when a coin is validated, and readjusts the count when corresponding coin credit signals are generated for transmission. The validator line balance circuit has an output for connection to the payphone chassis, and equalizes the loading on the telephone lines to minimize impedance fluctuations. Consequently, coins may be validated and accepted by the electronic coin validator as coin tones are being generated and transmitted by circuitry of the payphone chassis to a central office.

15 Claims, 5 Drawing Sheets

PAYPHONE ELECTRONIC COIN VALIDATOR

BACKGROUND OF THE INVENTION

The invention pertains to a payphone electronic coin validator.

In the United States the majority of the regional bell operating companies (RBOC's) and independent telephone company payphone service providers utilize coin lines instead of business lines for their payphones. Coin lines include tip, ring and ground lines, and utilize a Central Office to provide collect and refund signaling, to provide coin line supervision for such operations as call start and call end, and to determine remote rate determination for other than local calls.

Payphones connected to coin lines are commonly known as "Dumb" sets or "Smart" sets. A Dumb set has all telephone line functions performed at the Central Office, while a Smart set is characterized by an electronic chassis which performs some functions of the Dumb set as well as providing additional functions at the payphone station. An example of a Dumb set is a "32B" telephone in wide use in "Western-Electric Company"-style housings.

When a call is initiated, a coin validator inside the payphone outputs signals to the payphone chassis as nickel, dime and quarter coins are accepted. In the case of a Smart or Dumb set connected to coin lines, the payphone chassis generates coin signal pulses for the Central Office according to telephone company specifications.

Mechanical coin validators were used in all payphones before the development of electronic coin acceptors, which offer improved coin validation and processing functions. Conventional electronic coin validators typically work in parallel with a line balancing circuit resident in the payphone chassis, and rely on the balancing circuit to release the telephone line for a period sufficient to enable the coin validator to work correctly. However, the chassis line balancing circuit in most Dumb sets was not designed to accommodate an electronic coin validator. Thus, in many cases the response time of the balancing circuit is too slow to keep up with the quickly fluctuating power demands of the electronic coin validator. Consequently, electronic coin validators have been designed to operate in an idle mode when the dumb payphone chassis is performing coin tone signaling in order to avoid corrupting the coin tones. In addition, a coin fall-through fault occurs when a consumer feeds coins into the payphone at a fast rate during an interval when the validator is not adequately powered so that some coins that should have been validated and credited to the total amount are not.

It would therefore be advantageous to provide an electronic coin validator for a payphone that is fully functional during all off-hook conditions including when the payphone chassis circuitry is generating coin tone signals.

SUMMARY OF THE INVENTION

An electronic coin validator for connection to a payphone chassis is presented. The validator includes a coin passageway having at least one coin sensor, power circuitry for connection to payphone chassis power lines and connected to the coin sensor, a validator line balance circuit connected to the power circuitry, at least one coin signal line for connection to the payphone chassis, at least one coin value buffer, and a control means. The control means processes signals from the sensor to validate coins, adjusts the count in the at least one coin value buffer when a coin is validated, and readjusts the count when corresponding coin credit signals are generated for transmission. The validator line balance circuit has an output for connection to the payphone chassis, and equalizes the loading on the telephone lines to minimize impedance fluctuations.

The invention advantageously permits normal electronic coin validator operations to occur while coin tones are being generated by the Dumb set payphone chassis for the Central Office, thus eliminating the idle mode of operation used by conventional systems. In an implementation, the electronic coin validator operates to buffer coin credit signals and to release those corresponding to lower denomination coins in priority over coin credit signals of higher denomination coins so that a consumer is confident that each inserted coin has been credited. In addition, the payphone electronic coin validator according to the invention operates to minimize coin tone distortion by minimizing line impedance fluctuations due to electronic coin validator current consumption variations. Further, coin fall-through faults are substantially eliminated because the invention ensures that the electronic coin validator has adequate power to validate and credit inserted coins.

Other uses and advantages of the invention will be apparent in view of the drawings and the detailed description.

DETAILED DESCRIPTION

Figure 1:
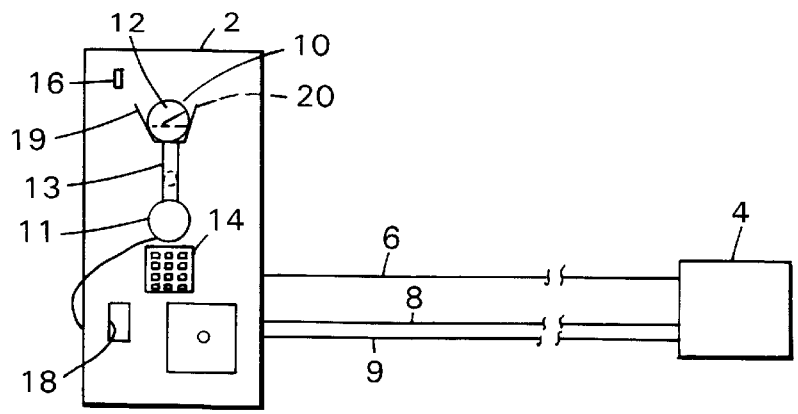
FIG. 1 illustrates a coin-operated telephone connected to a central office.

FIG. 1 shows a typical coin operated telephone or payphone 2 which is connected to a Central Office 4. The phone lines typically include three wires referred to as the tip 6, ring 8 and earth ground 9 lines. The payphone 2 includes a handset 10 having a mouthpiece 11 and an earpiece 12 which are connected by a handle 13, a keypad 14, a coin slot 16, and a coin return slot 18. When not in use by a customer, the handset 10 sits in a cradle 19 depressing a spring-loaded hook switch 20. When the handset 10 is in the position shown in FIG. 1, switch 20 is in its "on-hook" position. When handset 10 is lifted out of cradle 19, switch 20 is no longer depressed and it is then in its "off-hook" position.

In order to better understand the invention, a brief general description of how the payphone operates is set forth below. The Central Office 4 applies various D.C. voltage amplitudes and polarities on the tip 6 and ring 8 lines, from which the phone 2 generates its operational power when the handset 10 is off-hook. The varying DC voltages and an AC ringing voltage are interpreted by the coin telephone 2 as providing operational commands for controlling its operation. When handset 10 is on-hook, the phone 2 draws essentially no power from the tip 6 or ring 8 lines.

A customer picks up handset 10 to place a call thereby releasing the switch 20 from its depressed position. The phone 2 enters its off-hook state, and begins to draw power from the tip 6 and ring 8 lines to process the call. Next, the customer inserts a sufficient number of coins into the coin slot 16 to cover the cost of the call and the payphone transmits coin tone signals to the Central Office. The customer then dials the number using keypad 14, and the dialed number is transmitted to the Central Office 4 which connects the call. The customer completes the call by hanging up the phone, and then the money is collected by phone 2 when a collect signal from the Central Office 4 is received.

Figure 2:
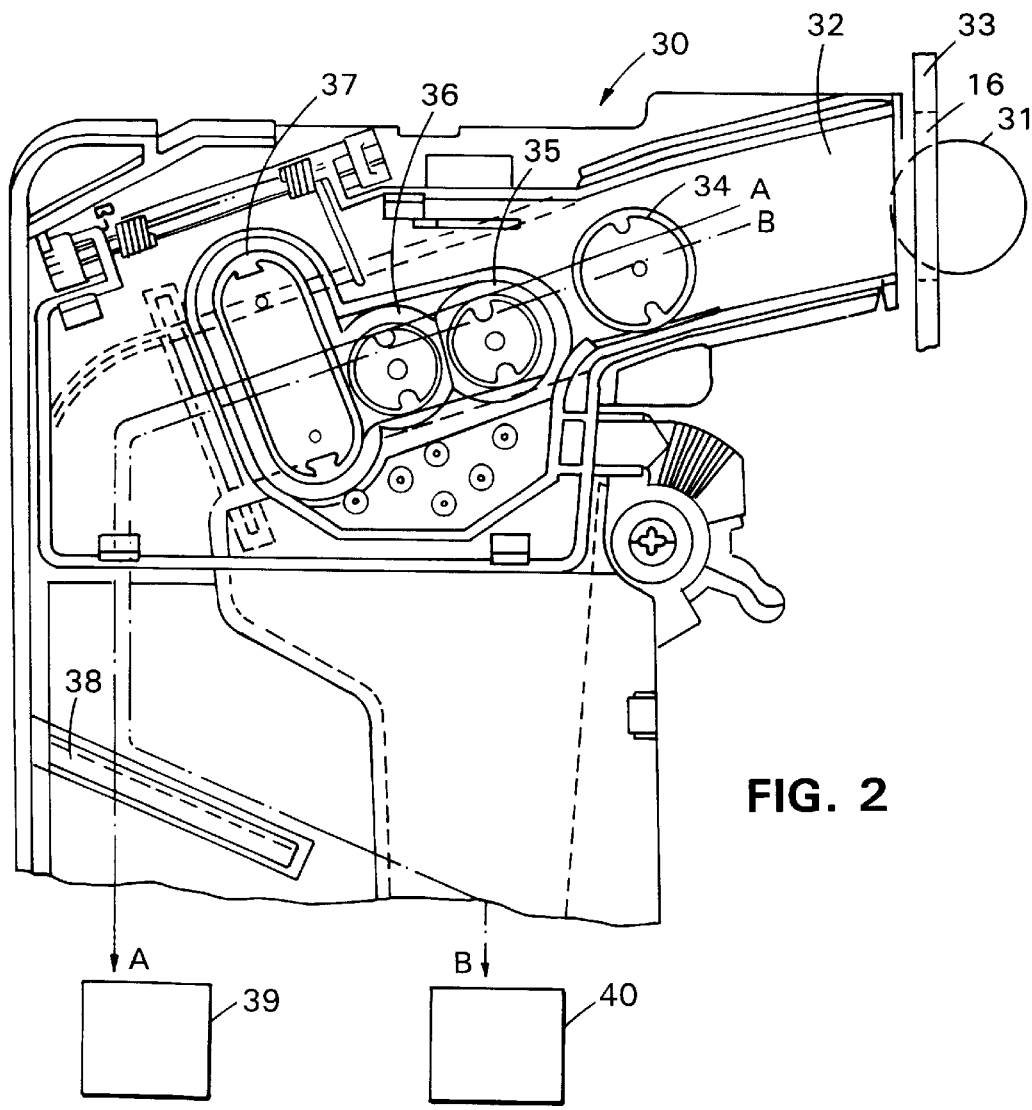
FIG. 2 is a partial cutaway side view of the upper portion of an embodiment of an electronic coin acceptor according to the invention.

FIG. 2 is a partial cutaway side view of the upper portion of an embodiment of an electronic coin acceptor 30. A customer's coin 31 is shown being inserted through coin slot 16 in front panel 33 of the phone 2. From the slot 16, the coin 31 can roll, slide, fall or be transported by a transport system, to travel in a coin passageway 32 defined by front and rear walls and coin tracks supported by these walls, past a plurality of coin detectors and sensors 34, 35, 36 and 37. In accordance with the invention, the coin passageway 32 has dimensions capable of accommodating U.S. and Canadian dollar coins, as well as quarters, nickels and dimes. In particular, the Canadian dollar coin has a thickness of approximately 2 millimeters (mm) and a diameter of approximately 27 mm, and one type of U.S. dollar coin has a thickness of approximately 2 mm and a diameter of approximately 26.5 mm. Therefore, depending on the market in which the payphone will be used (for example, Canada or the United States), the coin passageway 32 will be of appropriate dimensions to accommodate the coins that will be inserted by customers. Of course, if coins of other denominations and sizes, such as half-dollars or Canadian two-dollar coins, were to be accommodated then the dimensions of the passageway would be sized accordingly so that such coins could be inserted into the payphone.

Referring again to FIG. 2, after passing the last sensor 37, the coin 31 travels downward onto a gate 38 which directs the coin either to a coin escrow bucket 39 or to a return chute 40. The return chute directs a coin to the coin return slot 18 (see FIG. 1) where it can be retrieved by the customer. In traveling from slot 16 to the coin escrow bucket 39 or the coin return chute 40, the coin 31 travels along either an accept path A shown as a solid line in FIG. 2, or along the reject path B shown as a dashed line in FIG. 2.

Each of the sensors 34, 35, 36 and 37 produces an electrical output signal which serves as an input to a processing element or control circuit or microprocessor. Typically, the coin sensors 35, 36, 37 test a variety of a coin's characteristics, such as thickness, material and diameter. The microprocessor uses these signals to determine coin validity and denomination. The microprocessor also produces output signals to control the position of the gate 38 so that the gate either directs the coin along the accept path A or the return path B, and controls a power supply for energizing the gate. Thus, the microprocessor processes the electrical output signals from the sensors 34, 35, 36 and 37, generates gate control signals, and controls the gate power supply. The details concerning coin discrimination and validation functions and microprocessor control of the gate functions are beyond the scope of the present application, but can be found, for example, in U.S. Pat. Nos. 4,842,120 ("Jam Reducing Apparatus For Use In A Coin Operated Machine"), 4,953,681 ("Compact, Low Power Gate Apparatus For Coin Operated Machines"), 4,538,719 ("Electronic Coin Acceptor"), 5,167,313 ("Apparatus for Improved Coin, Bill and Other Currency Acceptance and Slug or Counterfeit Rejection"), 5,330,041 ("Apparatus for Improved Coin, Bill and Other Currency Acceptance and Slug or Counterfeit Rejection"), and 5,443,144 ("Apparatus for Improved Coin, Bill and Other Currency Acceptance and Slug or Counterfeit Rejection"), which are assigned to the assignee of the present invention. Furthermore, additional details of low power control apparatus for a payphone are described in U.S. Pat. Nos. 4,926,458 ("Low Power Control Apparatus For A Coin Operated Telephone"), and 4,979,208 ("Method And Apparatus For Electronic Payphone Open Switch Interval Management"), both assigned to the assignee of the present invention. The disclosures of these U.S. Patents are incorporated by reference herein.

Figure 3:
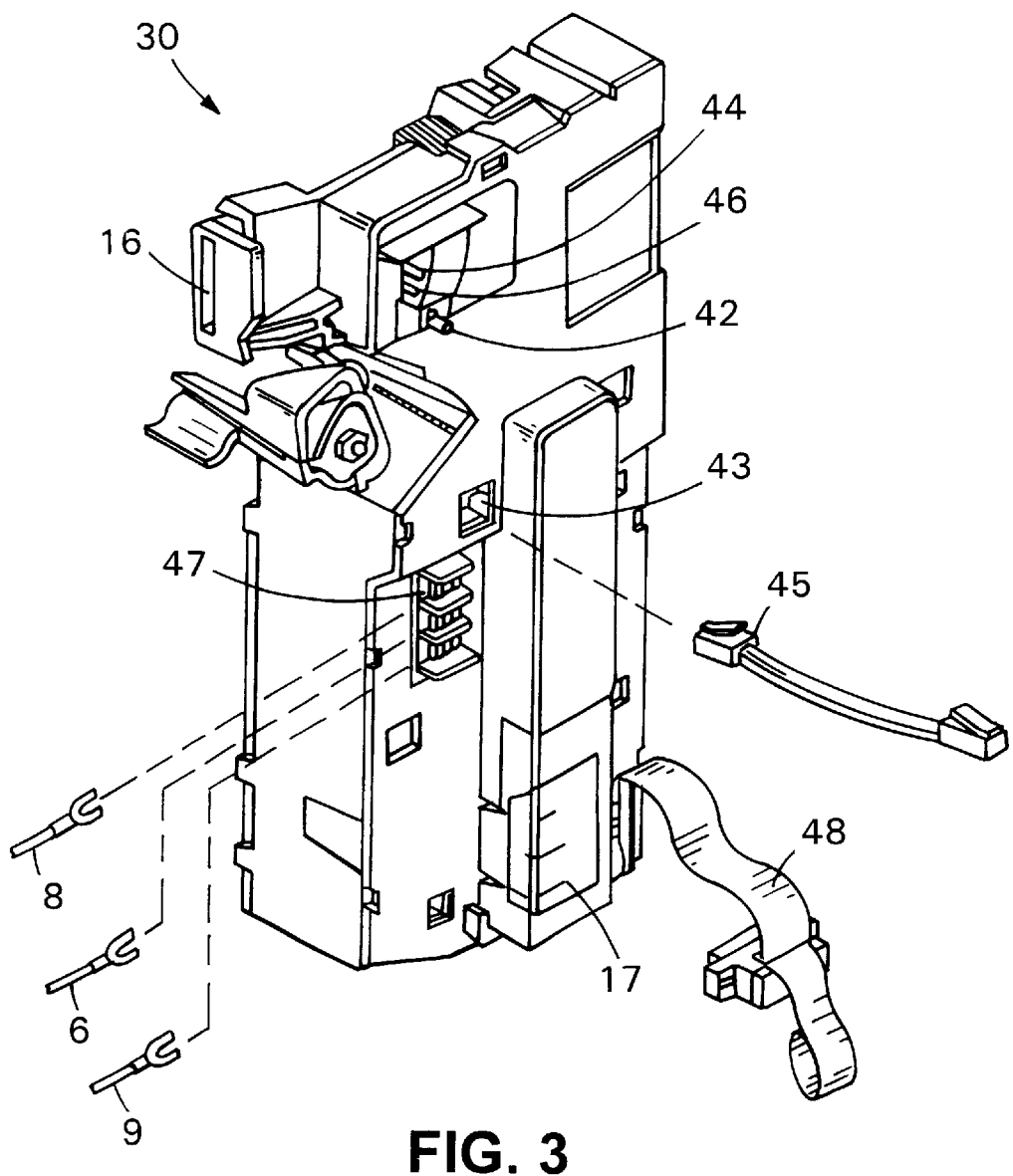
FIG. 3 is a perspective view of the electronic coin acceptor of FIG. 2.

FIG. 3 is a perspective view of an implementation of an electronic coin acceptor 30 for a payphone. The electronic coin acceptor 30 performs coin validation and denomination functions, and transmits coin credit signals to the payphone chassis. The device 30 may be used as a retrofit to an existing Dumb set payphone chassis, for example, the Western-Electric type B-set chassis. The electronic coin acceptor 30 contains a coin slot 16 that leads to the coin passageway 32 shown in FIG. 2 containing the coin sensors. The exterior of the housing 41 may include a test button 42 and two LED's 44, 46 which may be used to initialize audit functions and the like. A battery cover 17 may protect access to a replaceable battery (not shown), which may be a high-density, long-life battery preferably having at least a 5-year life, for powering certain functions when phone line power is unavailable. Connectors 47 accept the tip 6, ring 8 and ground 9 lines of a coin line. A pig-tail male plug 45 is shown for connection to female connector 43, and is used for connecting the tip, ring and ground lines from the integrated coin acceptor 30 to the payphone chassis (not shown). In this implementation, a 14-pin cable 48 is used to connect the circuitry of the electronic coin acceptor 30 to the payphone chassis. The cable 48 supplies power and control signals between the electronic coin acceptor and the payphone chassis, and may be modified to interface with the chassis circuitry of various Dumb sets.

The electronic coin acceptor 30 is designed to retrofit standard coin operated payphones which accept U.S. nickel, dime and quarter coins or international coins, and to provide the capability to accept coins of denomination greater than twenty-five cents. For example, the electronic coin acceptor is able to accept the U.S. dollar coin.

Figure 4:
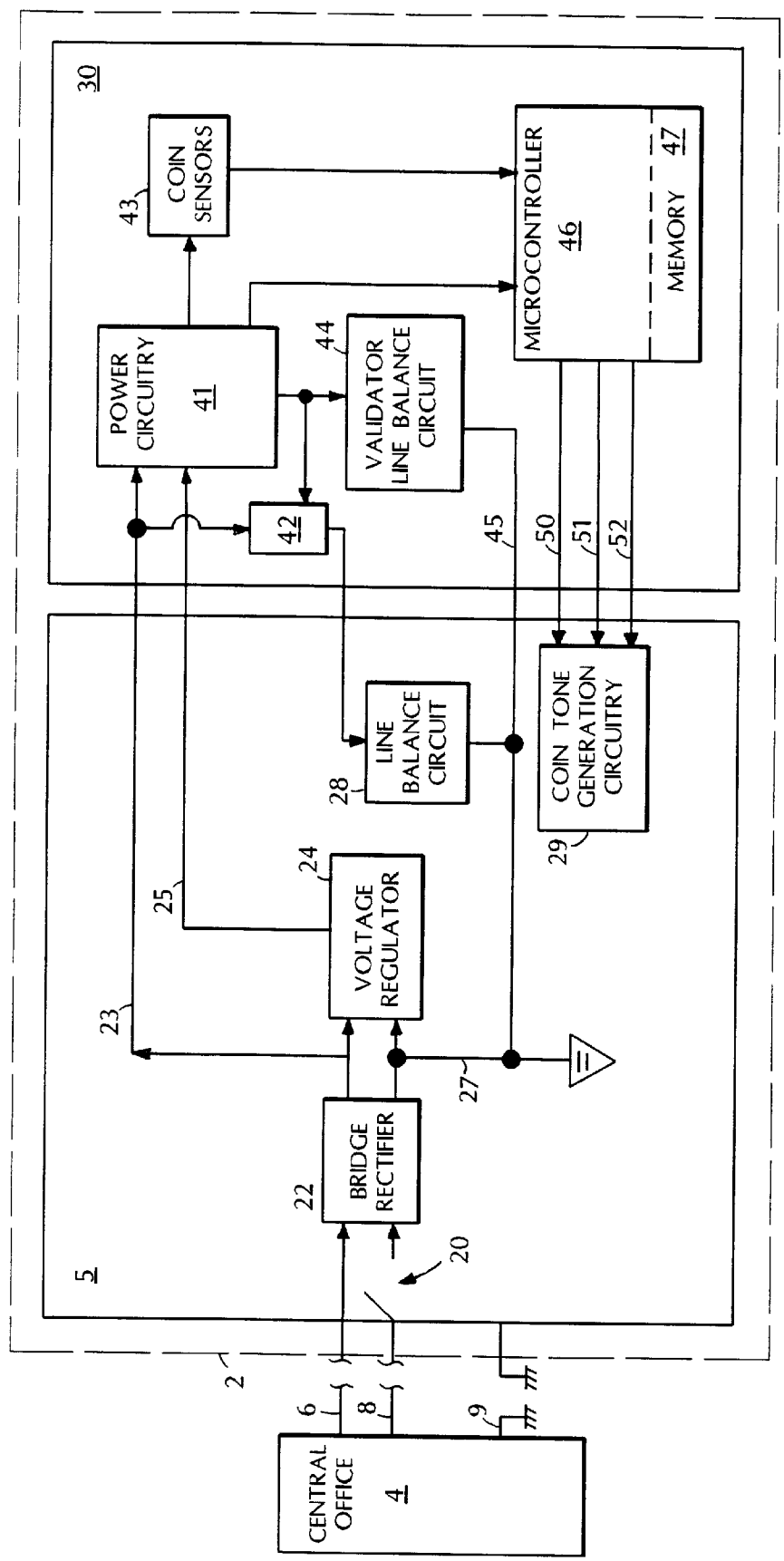
FIG. 4 is a simplified block diagram of an implementation of the electronic coin acceptor of FIG. 3.

FIG. 4 is a simplified block diagram illustrating a payphone 2 in dotted line outline, which contains an electronic coin acceptor 30 connected to a Dumb payphone chassis 5. The payphone 2 is connected to a Central Office 4 via tip 6 and ring 8 lines, and both the Central Office and the payphone chassis are connected to an earth ground line 9.

The electronic coin acceptor 30 includes a microcontroller 46 having a memory 47. The microcontroller may be a microprocessor or other control circuit having internal or external RAM, ROM, EPROM or other type of memory 47, and is connected to coin sensors 43 (for example, sensors 34, 35, 36 and 37 of FIG. 2). The microcontroller performs at least the following tasks: coin validation and denomination, coin acceptance, chassis interface functions and power management functions. The microcontroller may include coin credit output lines 50, 51 and 52 connected to the payphone chassis 5 that may be required by the Dumb telephone set. In alternate implementations, fewer or greater than three coin credit lines may be used, and the coin credit signals in such cases may be coded and transmitted serially or in parallel. In the implementation of FIG. 4, the microcontroller generates digital coin credit signals on a nickel output line 50 when a five cent coin is validated, on a dime output line 51 when a ten cent coin is validated and on a quarter output line 52 when a twenty-five cent coin is validated. Coin tone generating circuitry 29 of the payphone chassis 5 receives these signals and generates corresponding coin tone signals according to telephone company specifications and transmits the coin tone signals to the Central Office 4 on the tip 6 and ring 8 lines.

The tip line 6 is connected directly to a bridge rectifier circuit 22 in the Dumb set chassis 5, and the ring line 8 is connected to the bridge rectifier circuit through a hook switch 20. The bridge rectifier supplies an unregulated DC voltage via line 23 to the power circuitry 41 of the electronic coin validator 30, and to an integrated circuit 24 in the Dumb set chassis that includes a voltage regulator. The voltage regulator supplies a regulated voltage via line 25 to the power circuitry 41 of the electronic coin validator 30. In addition, the bridge rectifier circuit 22 via line 27 makes a ground reference voltage available. A line balance circuit 28 of the Dumb set payphone chassis operates between an unregulated voltage via line 23 and the ground reference voltage. A bypass circuit 42 may be connected to line 23 and to an output of the power circuitry 41 to regulate the operation of the Dumb set chassis line balance circuit 28 so that it is either disabled or operating in parallel with a validator line balance circuit 44. The current required to operate the electronic coin validator 30 is supplied from the unregulated voltage via line 23 and the regulated voltage via line 25 and is returned to the telephone line via line 45 from the coin validator line balance circuit 44. The coin validator line balance circuit passes the current from the electronic coin validator 30 to the ground reference voltage on line 45, and either replaces the line balance circuit 28 or operates in parallel with it.

Thus, the new line balance circuit 44 returns the current used by the electronic coin validator to the telephone lines. The coin validator line balance circuit 44 equalizes the loading on the telephone line, and ensures that the payphone operates within the telephone company specifications. The telephone line impedance is kept from excessively fluctuating when varying loads are placed on it by the electronic coin validator, such as when the accept gate is activated. Therefore, when the circuitry in the payphone chassis is generating coin tone signals, the validator line balance circuit 44 ensures that adequate current is available for that operation. This technique substantially eliminates coin tone distortion on the tip and ring lines when the payphone chassis is transmitting coin tones to the central office. Consequently, the electronic coin validator may validate coins even as coin tones are being generated and transmitted to the central office, in contrast to conventional coin validators that operate in an idle mode when coin tones are generated.

Before describing the technique for validating coins during coin tone generation, some background information concerning coin tone generation is set forth below. Current BellCore Company specifications require that, when a nickel is validated in payment for a phone call, a single dual-tone multiple-frequency (DTMF) burst of approximately 66 millisecond (ms) duration and at a frequency of approximately 1700 Hertz (Hz) and 2200 Hz be transmitted to the Central Office by the payphone chassis. For a dime, two DTMF tone bursts, each of approximately 66 ms duration with approximately a 66 ms silent period between them, at a frequency of approximately 1700 and 2200 Hz are required by the Central Office. For a quarter, five DTMF tone bursts, each of approximately 33 ms duration with approximately a 33 ms silent period between bursts, and a frequency of approximately 1700 and 2200 Hz is required. (See Bellcore Manual TR-TSY-000961, Mar. 1, 1990). The Central Office connects the call after the correct amount of tones is received indicating that the initial rate charge has been satisfied by insertion of the correct amount of coins, prompts a user for more money when time on the call runs out, and sends a signal back to the payphone to collect the money from the escrow bucket after a call has been completed.

Figure 5A:
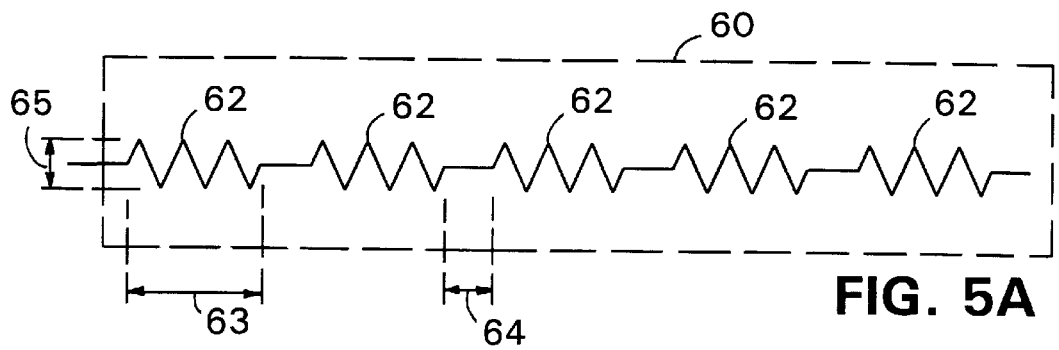
FIG. 5A illustrates a typical sequence of tone burst signals representing a U.S. quarter coin.

FIG. 5A illustrates a sequence 60 of tone bursts 62 that corresponds to the signal sent to the Central Office by a payphone chassis when a U.S. quarter has been validated. In particular, each of the five tone bursts 62 has a duration 63 of 33 ms±3 ms, and the tone bursts 62 are separated by a quiet period 64 of duration 33 ms±4 ms from one another. Each of the tone bursts 62 has an amplitude 65 of 700 millivolts (mv) to 1.4 Volts (V) peak-to-peak. Payphones currently in use transmit such a sequence of signals 60 to a Central Office to designate that a U.S. quarter (twenty-five cents) has been accepted in payment for a telephone call.

Referring again to FIG. 4, when a customer removes the handset from the hook switch 20 to initiate a call, the payphone begins to draw power from the tip and ring lines. As the user inserts coins, the coin sensors 43 generate signals that the microcontroller 46 utilizes to denominate and validate the coins. For example, when a quarter is inserted and validated, the microcontroller sends a digital quarter signal on quarter line 52 to the payphone chassis 5, and then the coin tone circuitry in the Dumb set chassis signals the Central Office. Escrow bucket circuitry (not shown) in the payphone chassis ensures that the quarter will stay in the escrow bucket until the Central Office 4 signals back that it should be collected. Although the coin validator 30 is capable of accepting and validating a coin of value in excess of twenty-five cents, such as a one-dollar coin, typically the payphone chassis is not capable of generating a one-dollar signal and the Central Office has no provision for recognizing such a signal. When a high value coin such as a one-dollar coin is validated and denominated, the microcontroller of the electronic coin validator operates to signal that value by controlling the signaling to the payphone chassis, as explained below.

Figure 5B:
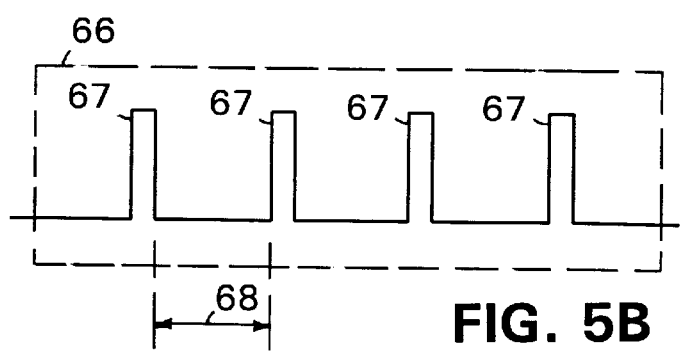
FIG. 5B illustrates a digital one-dollar credit packet signal.

FIG. 5B illustrates an example of a one-dollar credit signal packet 66 made of a series of four digital quarter signals 67 which may be stored in a memory for use by the microcontroller. These four signals may be output on quarter line 52 by the microprocessor 46 when a one-dollar coin has been authenticated. The microprocessor may also temporarily store the value of the coin in memory, in lieu of completion of the call. The digital quarter signals 67 are each separated by a quiet duration 68 of approximately 200 ms between them to permit the payphone chassis and the Central Office to accurately process the signals so that a total value of one dollar is recognized by the Central Office. In an implementation, the microcontroller of the electronic coin acceptor authenticates the high value coin, temporarily stores the value of the coin in memory, accesses the appropriate coin credit signal packet from memory and then outputs that credit signal packet to the payphone chassis. The microcontroller also controls the delay between each signal of the digital credit signals. Alternately, a buffer may be utilized to control the quiet duration 68 between digital signals, or other delay circuitry could be used to ensure that the correct sequence of digital quarter signals is transmitted.

Figure 5C:
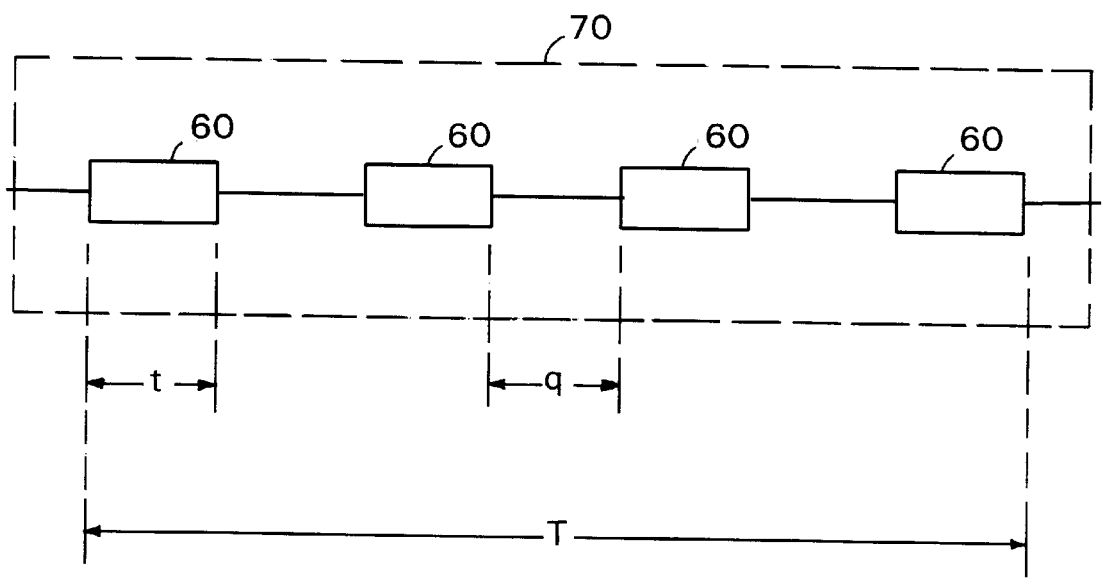
FIG. 5C illustrates a one dollar signal for transmission to a Central Office resulting from the signal of FIG. 5B.

FIG. 5C is an example of a one-dollar signal packet 70 corresponding to the signals sent to the Central Office by the payphone chassis after receipt of the digital one-dollar credit signal packet 66 of FIG. 5B. Thus, four quarter packets 60 having a duration t of approximately 300 ms±10% with a delay q between each of them of approximately 200 ms are generated. Thus, for a one dollar coin it takes approximately 1.8 seconds to signal all four quarter pulses. Consequently, in return for the convenience of payphone acceptance of one-dollar coins using a conventional payphone with an electronic coin validator, the customer experienced a delay of approximately two seconds while the DTMF signals are generated and transmitted to the Central Office. During this time, the prior art electronic coin validators would enter an idle mode wherein no other coins could be validated until after coin tone generation and signaling was completed.

Figure 6:
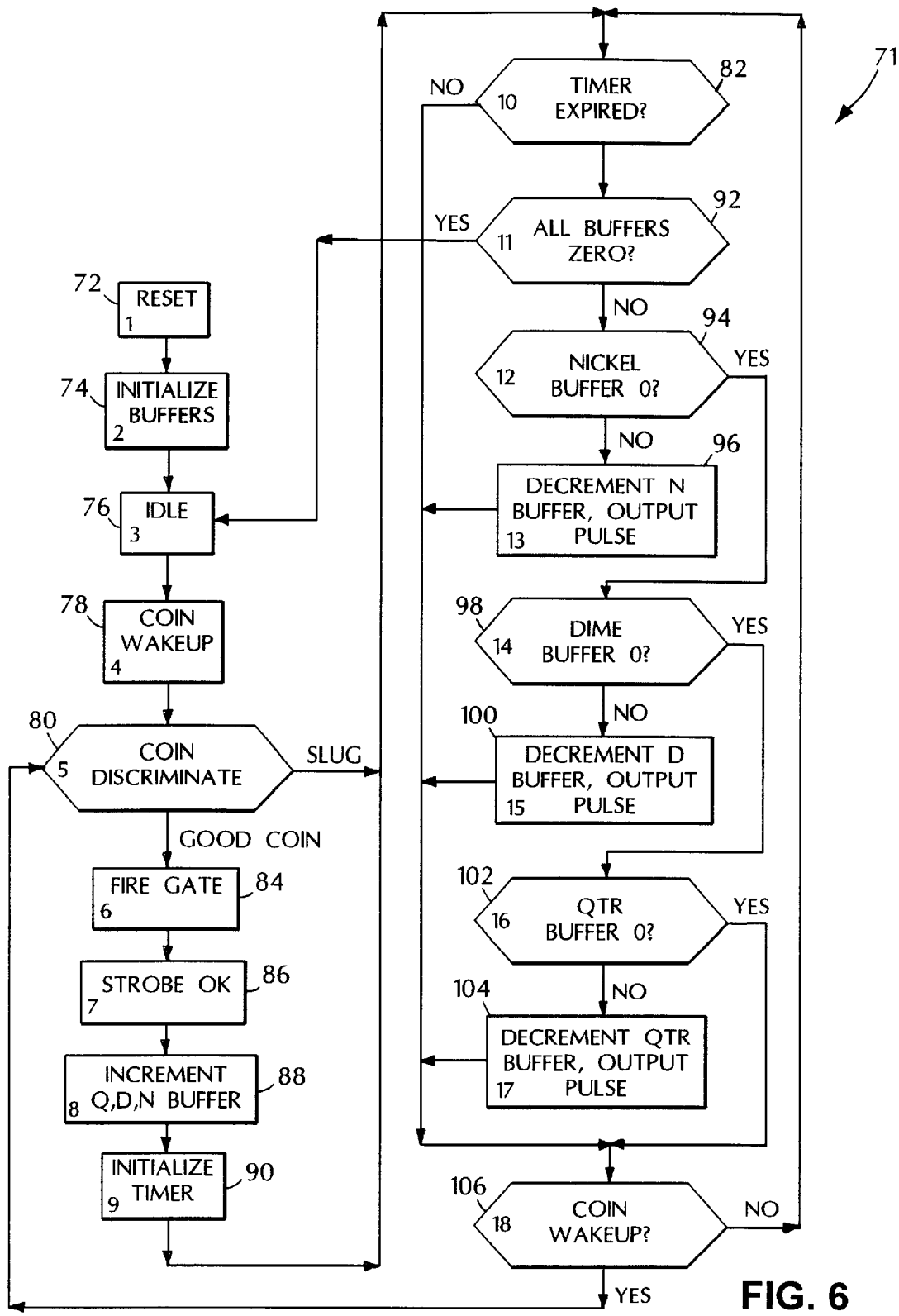
FIG. 6 is a flowchart of an implementation of a technique for buffering coin credits and releasing them to a Dumb set chassis according to the invention.

FIG. 6 is a flowchart 71 of an implementation of a technique for buffering a required number of coin value credit signals or pulses and then sequentially releasing them to the Dumb set chassis at the appropriate times. The method permits the electronic coin validator 30 to validate coins as they are inserted by a customer, even if coin tone generation has been initiated by circuitry in the Dumb set chassis. In addition, the technique provides feedback to a consumer by generating a coin tone audible in the earpiece when she inserts a coin so that the consumer is confident that appropriate credit has been given for payment.

Referring to FIG. 6, the coin processor is powered-up 72 and goes through a Reset state, initializes 74 the coin credit buffers and then enters an idle mode. The unit wakes up 78 when a coin is detected entering the coin validator and starts its discrimination algorithm 80. If the discrimination algorithm determines that the coin is a counterfeit then the logic branches to the Timer expired step 82, wherein the timer value will be zero and all buffers will be zero. Therefore, the routine will branch back to the idle mode 76. The counterfeit item may then be returned by routing it to the coin return slot without any credit being given.

If the coin is determined to be a valid coin in step 80, then the coin gate is activated 84 and a strobe certifies 86 that the coin passed the gate. Depending on the denomination of the coin, an appropriate quarter, dime or nickel credit buffer is incremented 88 and a timer is initialized and started. In this implementation, a dollar coin increments a count in the quarter credit buffer four (4) times, and genuine coins of other denominations (quarter, dime, nickel) increment a count in corresponding coin credit buffers one time. Other types of credit buffer adjustments could also be used to keep track of credit valuations as a consumer inserts payment.

A loop is now entered in steps 82 and 92 to 106 waiting for the Timer that was initialized in step 90 to expire, which in the present implementation occurs when the Timer reaches approximately 510 milliseconds. This length of time corresponds to that required for a twenty-five cent coin and is chosen to delay signaling of a coin value to the payphone chassis to prevent corruption of the generation and transmission of a coin tone (wherein here the length of time of the twenty-five cent coin tone is the worst-case delay). If another coin is inserted by the user before the Timer has expired, then coin wakeup occurs 106 and the routine flows back to step 80 to discriminate the coin. However, if the Timer expires, control drops through to 92 which executes an initial check to see if all credit buffers are zero. If the buffers are zero then the idle mode is again entered 76, otherwise the Nickel buffer is checked 94 for zero. If the Nickel buffer is not zero then a signal is output 96 on the nickel coin signaling line 50, and the Nickel buffer is decremented. Next, the validator again checks 106 to see if another coin was deposited. If not, then the logic branches to 82 wherein the Timer wait loop is again entered. If the Nickel buffer is zero in 94, then the Dime buffer is checked 98 for zero. If the Dime buffer is not zero then it is decremented 100 and a signal is output on the dime coin signaling line 51 and again a check is made 106 to see if another coin was inserted. If not, then the logic branches to 82 and the Timer wait loop is entered. If both the Nickel and Dime buffers are zero then the Quarter buffer is checked 102. If the Quarter buffer is not zero then it is decremented 104 and a signal is output on the quarter coin signaling line 52. Control then passes to the Timer wait loop again. This cycle continues until all of the coin buffers are zero. It should be understood, however, that the coin credit buffers could otherwise be adjusted to indicate credit values. It should also be understood that the payphone chassis cannot be signaled in the middle of generating a coin tone. Instead, the coin validator waits for a quiet interval between coin tones to signal coin value to the payphone chassis, which is accomplished by initializing a timer to introduce a delay after a coin is validated.

In the scheme of FIG. 6, nickel and dime pulses take precedence over quarter pulses so that the consumer will hear a coin tone in the earpiece soon after depositing a lower denomination coin rather than have to wait for the coin tone signaling of higher value coins to finish. The coin tone of an inserted coin is audibly distinguishable by the consumer, and is required so that the consumer is confident that the money she inserted has been credited. For example, if a dollar coin is deposited and validated, the quarter buffer is incremented four times so that over time four quarter signal packets will be transmitted to the Dumb set chassis. If the customer immediately deposits a nickel after having deposited the dollar coin, and the first quarter signal packet has been transmitted, the nickel will next be discriminated (step 106 to 80). Next, the nickel buffer will be incremented (steps 84 to 88). The flow will then proceed to steps 90 to 96 so that a nickel pulse will be transmitted which causes the chassis to output a nickel tone that the consumer can hear in the earpiece and audibly identify. The routine will then branch back to output the next quarter pulse of the one dollar value coin (see step 106 to step 82, and then steps 82 to 104). The nickel buffer is also decremented. Thus, all lower denomination coins are discriminated and their coin pulses transmitted to the Central Office before larger denomination coins. The consumer can hear that the inserted coins have been credited which reassures her that she received full credit.

The technique does not require the Dumb set chassis to be capable of handling a base dollar coin signaling method. The method is transparent to a consumer who inserts a dollar coin when using a payphone. The consumer now may quickly deposit a dollar coin and other denomination coins into a payphone and have them validated promptly without the inconvenient processing delays that typically occurred in conventional units, which required signaling of four quarters for the dollar coin to occur first before signaling any other coin.

In some circumstances, the Central Office may be configured to recognize a one-dollar coin tone and the telephone system may include payphones having a Dumb set chassis capable of generating such tones. The apparatus and method described above can be modified to work in such systems, to validate coins as they are inserted into the payphone.

A number of embodiments of the present invention have been described. Nevertheless, it will be understood that various modifications may be made without departing from the spirit and scope of the invention. For example, while examples of the technique discuss how to generate signals for a U.S. dollar coin, one skilled in the art would be able to use the technique disclosed with respect to other high value coins such as fifty-cent coins and/or two-dollar coins of U.S. or other country coin sets. Further, the flowchart of FIG. 6 could be modified to encompass different denomination coins and/or coins of different countries, or could be otherwise modified to adapt to particular coin sets that could be used to place a payphone call. Accordingly, other embodiments are within the scope of the following claims.

What is claimed is:

1. An electronic coin validator for connection to a payphone chassis wherein the validator is capable of validating coins even as coin tones are generated and transmitted, comprising:
   a coin passageway including at least one coin sensor;
   power circuitry for connection to payphone chassis power lines and connected to the coin sensor;
   a bypass circuit connected to the power circuitry and having an output for regulating a payphone chassis line balance circuit;
   a validator line balance circuit connected to the power circuitry and having an output for connection to the payphone chassis, for equalizing the loading on the telephone lines to minimize impedance fluctuations;
   at least one coin signal line for connection to the payphone chassis;
   at least one coin value buffer; and
   a control means connected to the coin sensor, to the power circuitry, to the coin signal line and to the coin value buffer, the control means processing signals from the sensor to validate coins, adjusting a count in the coin value buffer when a coin is validated, and readjusting the count when corresponding coin credit signals are generated for transmission on the coin line.

2. The apparatus of claim 1, wherein the coin signal line comprises at least one of nickel, dime and quarter signal lines.

3. The apparatus of claim 1, wherein the bypass circuit enables the validator line balance circuit to operate in parallel with the payphone chassis line balance circuit.

4. The apparatus of claim 1, wherein the bypass circuit enables the validator line balance circuit to operate independently of the payphone chassis line balance circuit.

5. A method for validating coins in a payphone, comprising:
   connecting an electronic coin validator including a validator line balance circuit and a bypass circuit to a payphone chassis;
   minimizing line impedance fluctuations due to electronic coin validator current consumption variations with the validator line balance circuit;
   validating coins even if coin tones are being generated and transmitted;
   buffering coin credits; and
   releasing coin credit signals to the payphone chassis.

6. The method of claim 5, further comprising releasing coin value signals of low denomination coins in priority over higher denomination coins.

7. The method of claim 5, wherein the impedance fluctuations are minimized by enhancing the operation of a chassis line balance circuit.

8. The method of claim 7, wherein the bypass circuit configures the validator line balance circuit for operating in parallel with the chassis line balance circuit.

9. The method of claim 7, wherein the bypass circuit configures the validator line balance circuit for operating independently of the chassis line balance circuit.

10. The method of claim 5, wherein the validator line balance circuit returns current to the payphone chassis to reduce the apparent power consumption of the electronic coin validator.

11. The method of claim 5, wherein the electronic coin validator line balance circuit minimizes coin tone distortion during coin tone signaling to enable the coin validator to simultaneously validate coins.

12. A method in a payphone electronic coin validator for generating coin credit signals, comprising:
   initializing a plurality of coin value buffers when an off-hook condition occurs;
   detecting item arrival;
   discriminating the inserted item;
   returning the inserted item if it is invalid;
   adjusting a buffer to represent the coin value if the inserted item is valid;
   introducing a delay before transmitting a credit signal to a payphone chassis;
   transmitting the credit signal representative of coin value to the payphone chassis and readjusting the selected buffer; and
   permitting adequate current to flow in the payphone chassis to minimize coin tone distortion during coin tone generation to permit simultaneous coin validator functions.

13. The method of claim 12, further comprising transmitting credit signals of low denomination coins in priority to credit signals of higher denomination coins.

14. An article comprising a computer-readable medium which stores computer executable instructions for operating a payphone electronic coin validator for generating coin credit signals, the instructions causing a computer to:
   initialize at least one coin value buffer when an off-hook condition occurs;
   detect item arrival when an item is inserted;
   discriminate the inserted item;
   return the inserted item if it is invalid;
   adjust a coin value buffer to represent the coin value if the inserted item is valid;
   introduce a delay before transmitting a credit signal to a payphone chassis;
   transmit the credit signal representative of coin value to the payphone chassis and readjust the coin value buffer; and
   permit adequate current to flow in the payphone chassis to minimize coin tone distortion during coin tone generation to enable the coin validator to simultaneously validate coins.

15. The article of claim 14, the instructions further causing the computer to transmit credit signals of low denomination coins in priority to credit signals of higher denomination coins.

* * * * *